United States Patent [19]

Leclercq et al.

[11] 4,411,862
[45] Oct. 25, 1983

[54] SPACER GRATING FOR FUEL ELEMENT IN A NUCLEAR REACTOR

[75] Inventors: Joseph Leclercq, St. Didier; Jacques Le Pargneux, Lyons; Claude Feutrel, Vauhallan; Guy Lestiboudois, Paris; Michel Chantant, Bois d'Arcy, all of France

[73] Assignee: Commissariat a l'Energie Atomique, Paris, France

[21] Appl. No.: 226,895

[22] Filed: Jan. 21, 1981

[30] Foreign Application Priority Data

Jan. 22, 1980 [FR] France ............................ 80 01304

[51] Int. Cl.³ .............................................. G21C 3/34
[52] U.S. Cl. .................................... 376/442; 376/441
[58] Field of Search ..................... 376/438, 441, 442

[56] References Cited

U.S. PATENT DOCUMENTS

3,431,171 3/1969 Glandin ............................... 376/441
3,890,196 6/1975 Chetter ............................... 376/441
4,221,636 9/1980 Feutrel ............................... 376/441

Primary Examiner—Donald P. Walsh
Attorney, Agent, or Firm—Kerkam, Stowell, Kondracki & Clarke

[57] ABSTRACT

The present invention relates to a spacer grating for fuel element in a nuclear reactor of the PWR type, said grating being constituted by intersecting plates. Over the greater part of the walls equipped with springs, double springs comprise two active parts on either side of the wall on which the double spring is placed, allowing the symmetrical action of this spring on two different pencils inside two adjacent cells. On the other walls equipped with springs, single springs comprise one active part only, disposed in one of the two cells separated by the wall on which is placed the spring of which the other part is not capable of coming into contact with a fuel pencil. The invention is particularly applicable to the manufacture of fuel assemblies in nuclear reactors of the PWR type.

18 Claims, 24 Drawing Figures

SPACER GRATING FOR FUEL ELEMENT IN A NUCLEAR REACTOR

The present invention relates to a spacer grating for a fuel assembly used in a nuclear reactor constituted by intersecting plates in square-mesh lattice form.

Fuel assemblies in nuclear reactors, particularly light water nuclear reactors, are generally constituted by a bundle of fuel pencils, i.e. tubes, made of material which sparingly absorbs neutrons, filled with pellets of fissile matter, the bundle being assembled with the aid of pieces disposed at each of the ends of the assembly. For transversely holding the fuel pencils in the bundle, spacer gratings are generally used, constituted by plates intersecting in square-mesh lattice form, the fuel pencils passing in the cells of the grating. In this way, the pencils are in regular arrangement in the transverse directions imposed by the grating. Certain of the places arranged by the spacer gratings for the fuel pencils are occupied by guide tubes which are connected at their ends to the plates of the assembly to ensure cohesion thereof. Each cell defined inside the spacer gratings receives either a fuel pencil, a guide tube, or a tube allowing passage of instruments for automatic control of the core of the reactor.

To ensure transverse holding of the fuel pencils inside the cells of the spacer gratings, it is necessary to exert transverse forces on these pencils and to this end to provide devices borne by the walls of the cells of the grating extending inwardly of the cell, these cells being of such dimensions that a considerable clearance is made between the pencil and the walls of the cell. This considerable clearance is in fact necessary to allow the flow of the coolant and to facilitate installation of the assembly.

The devices for holding the pencil inside the cells of the grating must in particular allow a sufficient semi-rigid fit of the pencils in the cells of the grating to avoid displacements and deformations of the pencils of too great amplitude and an exaggerated bending under the effect of the deformations of thermal origin and caused by irradiation. Deformations of thermal origin are generally caused by temperature gradients between guide tubes, guide tubes and pencils and pencils between themselves, the deformations due to the effect of irradiation resulting from a certain dispersion in the elongations due mainly to the flux gradients and to the stress gradients. In fact, if the structure of the assembly is too strongly disturbed during operation in the reactor, the circulation of the coolant fluid of the reactor risks being modified and a certain asymmetry of this flow may occur locally, so that the conditions of exploitation of the reactor diverge from the optimal conditions. On the other hand, a semi-rigid fit of the pencil which employs too considerable tightening forces on the tubular cladding of the pencil, excessive stresses of abutment on this cladding as well as axial stresses in this cladding produced by the differential thermal explansions which risk destroying it at the semi-rigid fit, must be avoided.

A mode of fixing the pencils in the cells of the grating must also be avoided which risks introducing exaggerated wear and tear of the cladding of this pencil under the effect of the vibrations to which the assembly in operation is subjected by exerting in this case a relatively great tightening force ensuring the best moment of semi-rigid fit.

Devices have therefore been proposed for holding the fuel pencils in the cells of spacer gratings, whose object was to provide an acceptable compromise between these contradictory requirements.

It has, for example, been proposed to make the spacer gratings of an elastic alloy such as an alloy of nickel or a stainless steel, springs and rigid stops being obtained by cutting out and pressing certain portions of plates constituting the grating to form devices for retaining the pencils.

Such a solution presents the drawback of introducing in the assembly gratings of a relatively large volume made of a material which strongly absorbs the neutrons.

It has also been proposed to make the plates constituting the cells of the grating of a material which sparingly absorbs the neutrons, such as an alloy of zirconium, elements for holding the fuel pencils being added to these zirconium alloy gratings. These holding elements may be constituted by springs made of elastic alloy and by rigid stops disposed on the plates constituting the different walls of the cells of the grating, so that, in each cell, the springs are on faces opposite the faces of these cells on which the rigid stops are disposed.

To make this distribution of the springs and the rigid stops added to the plates of the grating, it has been proposed to use springs comprising two active parts on either side of the wall on which the spring is disposed to allow the action of the spring on two different pencils inside two adjacent cells. Such springs may, for example, be constituted by a leaf made of elastic material surrounding the plate and closed on itself.

In each cell of such a known embodiment with cells of a single type, double springs are associated with two of the walls of the cell and rigid stops with the other two walls. However, such devices do not enable a grating comprising an odd number of cells to be entirely equipped on each of its sides and neither do they take into account the disturbances caused, in the distribution of the springs equipping the cells containing the fuel pencils, by guide tubes disposed in the lattice whose mode of fixation on the cell is rigid.

It is an object of the invention to provide a spacer grating for a fuel assembly used in a nuclear reactor, constituted by intersecting plates in square-mesh lattice form, in the cells of which the fuel pencils pass for transverse holding thereof; these pencils constitute a bundle where certain pencils are replaced by guide tubes, the plates which constitute the walls of the cells bearing elements for holding the fuel pencils projecting inside the cells, of two types, namely, on the one hand, rigid stops, and, on the other hand, springs adapted to exert transverse forces on the fuel pencils, added to the grating and disposed around the plates so that each of the faces of each cell containing a pencil bears on element of type different from that borne by the opposite face, this grating having to allow an efficient holding of the pencils without leading to a deterioration of the claddings of these pencils. According to the invention, the adequate distribution of the springs and the rigid stops is obtained despite the presence of guide tubes and an odd number of cells on each of the sides of the grating, whilst avoiding the use of too numerous holding elements associated with the walls of the grating and too large a quantity of neutron-absorbing material for constituting these holding elements.

To this end, the spacer grating according to the invention comprises:

on the greater part of the walls equipped with springs, double springs comprising two active parts on either side of the wall on which the double spring is placed, allowing the symmetrical action of this spring on two different pencils inside two adjacent cells;

on the other walls equipped with springs, single springs comprising one active part only, disposed in one of the two cells separated by the wall on which is placed the spring of which the other part is not capable of coming into contact with the fuel pencil, the rigid stops being arranged on the plates of the grating independently of the springs.

In a variant embodiment of the invention, single springs are found on the other walls equipped with springs and/or rigid stops, which comprise one active part only, disposed in one of the two cells separated by the wall on which is placed the spring which is connected to rigid stops coming into contact with the fuel pencil passing through the cell located on the other side of said wall, and rigid stops located on one side of a wall of the cell and constituted by added pieces made fast with the single springs or the rigid stops placed on the other side of the wall.

According to a particular embodiment of the invention, the springs comprise two arms disposed on either side of the wall on which they are added and welded together at their two ends, so that the moments and shearing strains exerted on one of the arms are balanced to a large extent by those exerted on the other arm and are virtually not transmitted to the plate constituting the wall of the grating.

According to a likewise preferred embodiment of the invention, the springs have on their active parts a section comprising two parts projecting inwardly of the cells of the grating coming into contact with one of the generatrices of the pencil at two points spaced apart at maximum along the length of this pencil and the faces of the cells opposite these springs with double projection comprise two rigid stops disposed substantially at the level of the projections of the springs in the transverse direction perpendicular to the faces of the cells in question.

It is also an object of the invention to provide a spacer grating, wherein the walls of cells equipped on one side with springs and on the other side with rigid stops, comprise a spring with two projections and three rigid stops added and fixed to the wall due to two welded end shoulders and to a likewise welded median sliding plate, each housed in one of the three rectangular openings made in alignment on the wall, and to two fixing orifices disposed near the shoulders, so that the transverse thrust forces exerted on each side of the wall are directly balanced via the shoulders and the median sliding plate, without stress of the wall in flexion, the balancing of the longitudinal thrusts on the two projections being effected by sliding of the median sliding plate mounted to this end with a longitudinal clearance in its opening, and the fixing of the end shoulders in their respective opening being obtained with the aid of bent edges of the shoulders tightening on the wall.

In a variant embodiment, the preceding spacer grating is characterised in that the walls of cells equipped with rigid stops on their two faces, comprise a pair of rigid stops back to back at each end, each rigid stop being ovoid in form, obtained by cold-forming a strip of Inconel, each pair of rigid stops being added and fixed to the wall via two welded shoulders, each mounted with a longitudinal clearance in a rectangular opening in the wall, to which they are fixed by bent edges tightening on the plate.

In another variant embodiment, the walls of the cells of the spacer grating are equipped on each side with two pairs of springs constituted by two continuous strips of Inconel welded to each other in three zones through three aligned rectangular openings in the wall, namely two end zones or shoulders fixed by bent edges to the wall and a central zone or median sliding plate mounted with a longitudinal clearance in its corresponding opening.

In an advantageous embodiment, the outer wall of a cell containing a guide tube is equipped with an added rigid stop formed in a strip crimped at its two ends in a slot made to this end in said wall. Furthermore, to promote the guiding of the plates forming the walls of the cells during assembly, said plates may be provided with embossed portions having a bevelled section in the direction of introduction of said plates.

In order to understand the invention more readily, an embodiment of a spacer grating according to the invention will now be described by way of non-limiting example with reference to the accompanying drawings, in the case of fuel assemblies for a light water nuclear reactor and the elements for transversely holding the fuel pencils equipping this grating.

Figure 1:
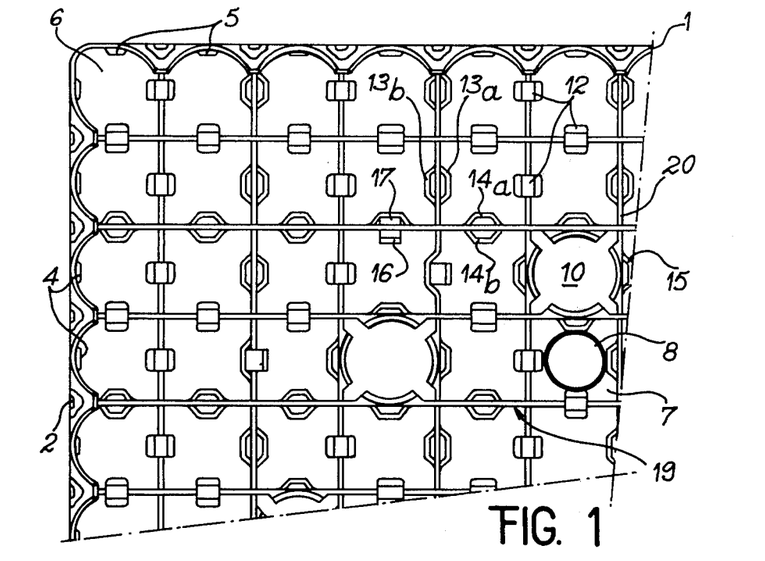
FIG. 1 shows a plan view of the spacer grating.

Referring now to the drawings, FIG. 1 shows a portion of a grating for fuel assemblies of a light water nuclear reactor near a corner of this grating. The whole grating comprises seventeen cells along each of the sides of the grating. The grating is limited on its periphery by walls such as 1 and 2 constituted by a plate of long length bearing openings for constituting stiffeners.

The outer walls of the grating also bear rigid stops such as 4 and 5 at the level of each of the cells on one wall, as far as the cells on the sides are concerned and on two walls, as far as the corner cells 6 are concerned.

The grating as shown in FIG. 1 comprises cells 7 for the fuel elements such as 8 and cells 10 for the guide tubes.

The greater part of the cells 7 in which pass the fuel cells 8 have two walls equipped with double springs 12 disposed successively on the perimeter of the cell, the two walls opposite these walls equipped with double springs 12 comprising double rigid stops 13 and 14, the rigid stops 13a and 13b and the rigid stops 14a and 14b respectively located on one and the other wall, being directly inwardly of the cell and inwardly of the adjacent cell disposed on the other side of the wall in question.

The plates of the cells 10 reserved for the passage of the guide tubes do not comprise any spring on their wall, but solely rigid stops 15 directed towards the adjacent cells and connection means towards the inside of the cell where the guide tube passes for the rigid fixing of this guide tube inside the cell.

In a 17×17 assembly, i.e. an assembly comprising 17 cells on each of the sides of the grating, 24 guide tubes are disposed which obviously necessitate 24 cells such as cells 10.

This presence of cells 10 of which the walls do not comprise a spring introduces a disturbance in the lattice of the elements holding the fuel pencils, so that it is necessary to dispose, at certain spots, single springs 16 comprising one active face only in one of the cells, the adjacent cell comprising on the wall where the single spring is located, a rigid stop 17 made on the wall in question independently of the spring 16.

In the same way, single springs 16 are necessary to take into account the disturbances in the distribution of the transverse holding elements caused by the fact that the number of cells on the sides of the grating is an odd number and the outer walls of this grating bear only rigid stops such as 4 and 5.

Taking into account the inevitable dissymmetries of the whole of the grating due to the presence of the guide tubes, it is therefore seen that the cells of the grating are made by associating four different wall types, namely:

the walls equipped with springs on their two faces;
the walls equipped with rigid stops on their two faces;
the mixed walls equipped on one side with springs and on the other side with rigid stops;
the walls of the cells for guide tubes, equipped with rigid stops on the face not in contact with the guide tube.

Figure 2:
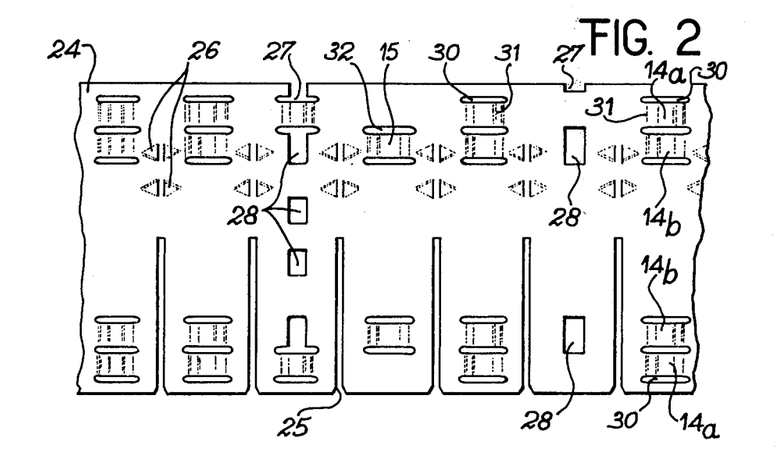
FIG. 2 shows an enlarged view, in elevation, of a plate constituting the grating, before the grating is assembled.

The grating shown in FIG. 1 is constituted by plates 19 and 20 intersecting at right angles, such a plate being shown in FIG. 2. In FIG. 2, the plate has been shown after cutting out and before bending, said bending itself preceding the assembly of the grating.

Figure 3:
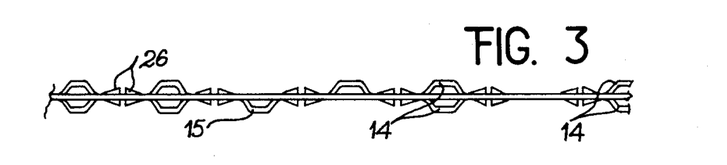
FIG. 3 shows a plan view of the same plate after the folding operation preceding the assembly of the grating.

In FIG. 3, the same plate has been shown in plan view after bending and pressing preceding the operation for assembly of the grating.

The plate shown in FIGS. 2 and 3 is constituted by a strip cut out in a particular form and presenting a series of slits 25 spaced apart by a distance equal to the sides of the cells of the grating.

The grating is assembled by lap-jointing the plates, of the same width as the plate shown in FIG. 2, introduced reciprocally in the slits 25 so as to define the cells of the grating. These intersecting plates are connected together after assembly by a weld 26-2 made at each lower and upper corner of the defined cell.

When the plates are being intersected, edges of the slits 25 are guided and positioned through embossed portions 26 obtained by cutting out and pressing the plate shown in FIG. 2.

The embossed portions 26 ensure in a first function the guiding of the plates when they are assembled. In order to facilitate this guiding, the embossed portions 26 have a bevelled section obtained directly when the plate is cut out.

Figures 2A, 2B:
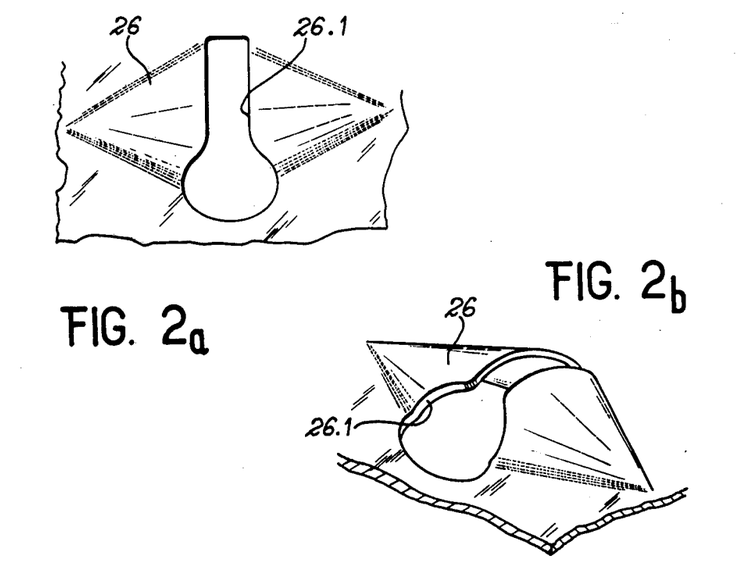
FIGS. 2a, 2b, 2c explain in detail the installation of the different plates constituting the walls of the cells.

FIGS. 2a and 2b show an embodiment of this guiding obtained by a prior cut-out of the plate in the form of a key-hole (26-1) which, after the embossed portions have been formed, has a bevelled section in the direction of introduction of the plates.

Figure 2C:
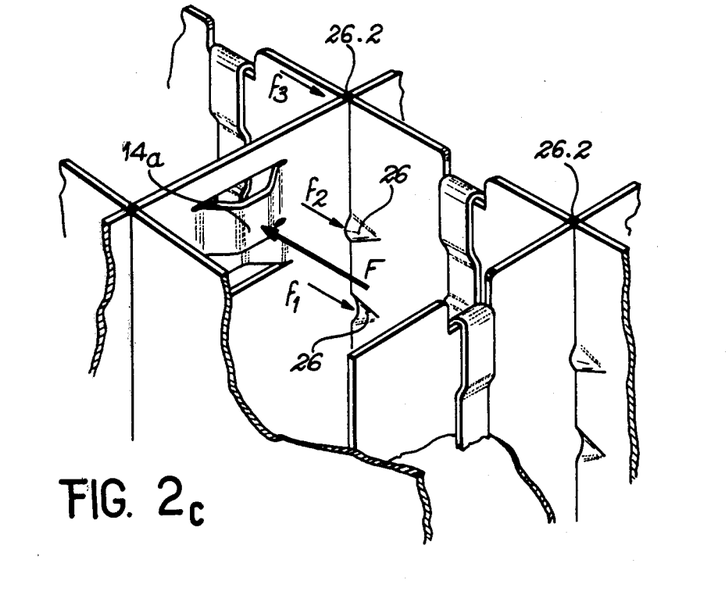

The second function of the embossed portions is to ensure a distribution of the transverse forces transmitted to the rigid stops (14a and 14b). FIG. 2c shows how the torque induced by the forces F of two pencils located in two adjacent cells is taken up by the reactions of abutment $f_1$ and $f_2$ in the embossed portions 26 and by the reaction of abutment $f_3$ at the level of the weld spots 26-2.

The preferred arrangement which consists in implanting the embossed portions in the vicinity of and on each side of the support elements 14a and 14b enables the forces of type $f_1$, $f_2$ and $f_3$ to be distributed.

The plate 24 comprises in particular openings 27 and 28 for the introduction of springs constituted in the form of pins which will be described in greater detail hereinafter.

The plate 24 also comprises openings 30 between which the metal is pressed and bent along edges 31 to form pressed rigid stops 14 such as those which are also visible in FIG. 1. These rigid stops 14 disposed on either side of the wall are provided in the upper part and in the lower part of the plate 24 to form rigid stops for the fuel pencil located in the corresponding cell and coming into contact with this pencil at points spaced apart by a relatively long length with respect to the height of the plate.

The plate 24 also comprises openings 32 for forming rigid stops such as 14, 15, by pressing.

The plate shown in FIGS. 2 and 3 corresponds to the plate 19 of the grating shown in FIG. 1; it has been shown solely to illustrate the different types of openings and rigid stops made in the plates constituting the grating.

Figures 4, 5, 6, 7:
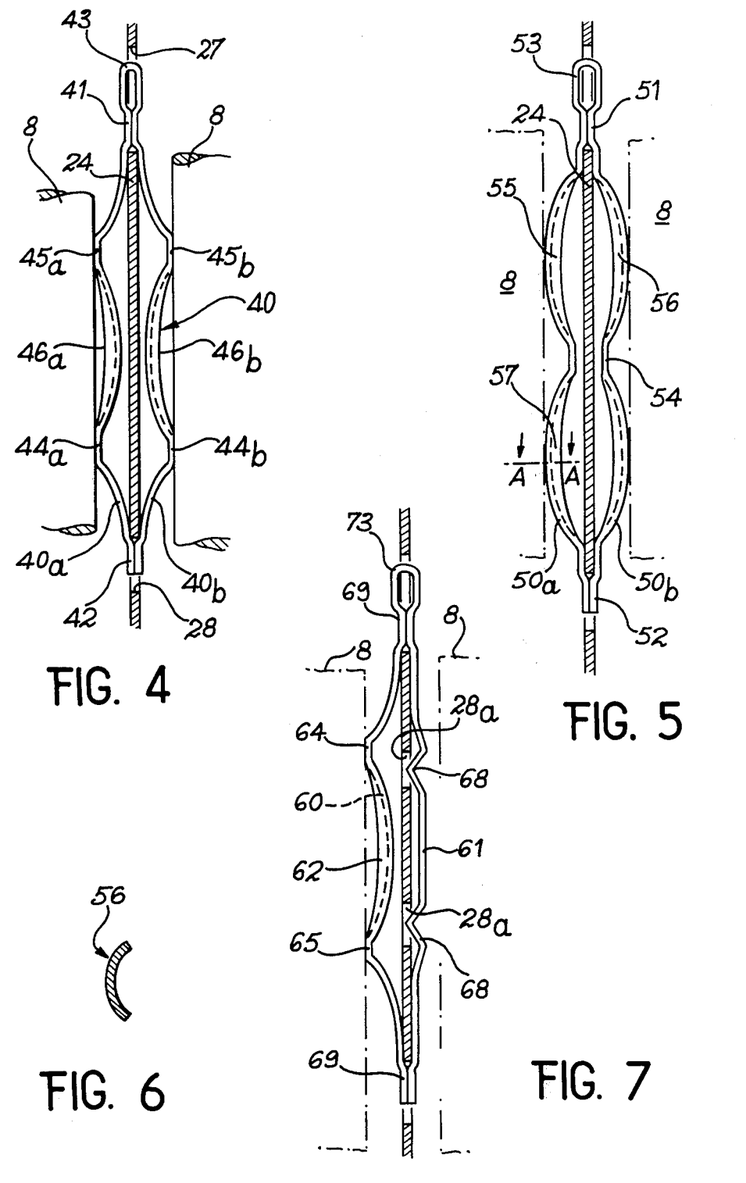
FIG. 4 shows a double spring according to a first embodiment in a view in elevation.
FIG. 5 shows a double spring according to a second embodiment, in a view similar to the view of FIG. 4.
FIG. 6 is a section along A—A of FIG. 5.
FIGS. 7 and 8 show single springs according to two different embodiments and in elevational views.

FIG. 4 shows a first embodiment of a double spring, added to a plate 24 such as the plate shown in FIG. 2 and surrounding this plate 24 at openings such as 27.

This double spring 40 is constituted in the form of a pin having two arms 40a and 40b constituted from a leaf bent on itself and welded in the vicinity of the two ends of the pin in zones 41 and 42.

The top part of the pin constitutes a loop 43.

The arms 40a and 40b of the pin are symmetrical with respect to the plate 24 and comprise, in their active parts, two flattened support surfaces 44a and 45a, 44b and 45b projecting inwardly of the adjacent cells to come into contact with the pencils 8. Between these two support surfaces 44a and 45a or 44b and 45b, the rigidity of the metal leaf constituting the spring is reinforced by forming the edges 46a and 46b of this leaf which, in this central part of the arms of the pin, has a C-section.

The support surfaces 44 and 45 are spaced apart by a distance in the vertical direction substantially equal to the distance between the rigid stops 14 made on the plates 24.

A double spring such as shown in FIG. 4 enables balanced forces to be applied, due to the rigid central part of the pin forming the spring, at two points of a fuel pencil 8 disposed in one of the cells limited by the plate 24.

When transverse forces are applied by one of the arms of the spring on a fuel pencil, these forces are taken up directly in the other arm of the spring pin since the latter is not fixed on the plate 24 but simply surrounds this plate without tightening the pin on the plate. This second arm itself applying transverse forces on the fuel pencil of the adjacent cell which it serves, these forces are taken up directly in the first arm, thus defining a symmetry of the forces exerted on the two fuel pencils.

In this way, the transverse forces exerted on the pencils are therefore virtually not applied on the plates of the grating, a balancing of these forces being possible at the level of each pin which thus works by essentially axial deformation with respect to the wall, the pin being able to slide along said wall.

FIG. 5 shows a double spring having a form different from the spring pin shown in FIG. 4, but performing the same functions.

This spring pin 50 also comprises two arms 50a and 50b of which the upper and lower rounded parts 55 and 57 respectively project and come into contact with the pencils 8 to exert a transverse force on these pencils 8.

The top and bottom rounded parts of each of the arms of the pin are made rigid by shaping the edges of the metal leaf constituting the two arms of the pin to obtain a C-section (56) at the level of these rounded parts, as shown in FIG. 6.

On the other hand, the central part 54 of the arms 50 is not rigidified and constitutes a zone of articulation between the two rigid parts of each of the two arms of the pin. It is the deformation of this central part of the two arms of the pin which comes into light contact with the plate 24 of the arms of the pin and enables the balance of the forces exerted by the pencils 8 to be taken up, with the zones 52 and 51.

As in the spring pin shown in FIG. 4, the upper zone 51 and lower zone 52 are welded one to the other to connect the two arms of the pin around the plate 24, whilst the top part 53 is in the form of a loop.

As in the case envisaged hereinabove, the forces exerted on the pencils 8 in the cells on either side of the plate 24 are only weakly supported by this plate 24 and are mostly transmitted from one arm of the pin to the other and consequently are balanced, bringing about a substantially axial deformation.

Figures 8, 9, 10, 11:
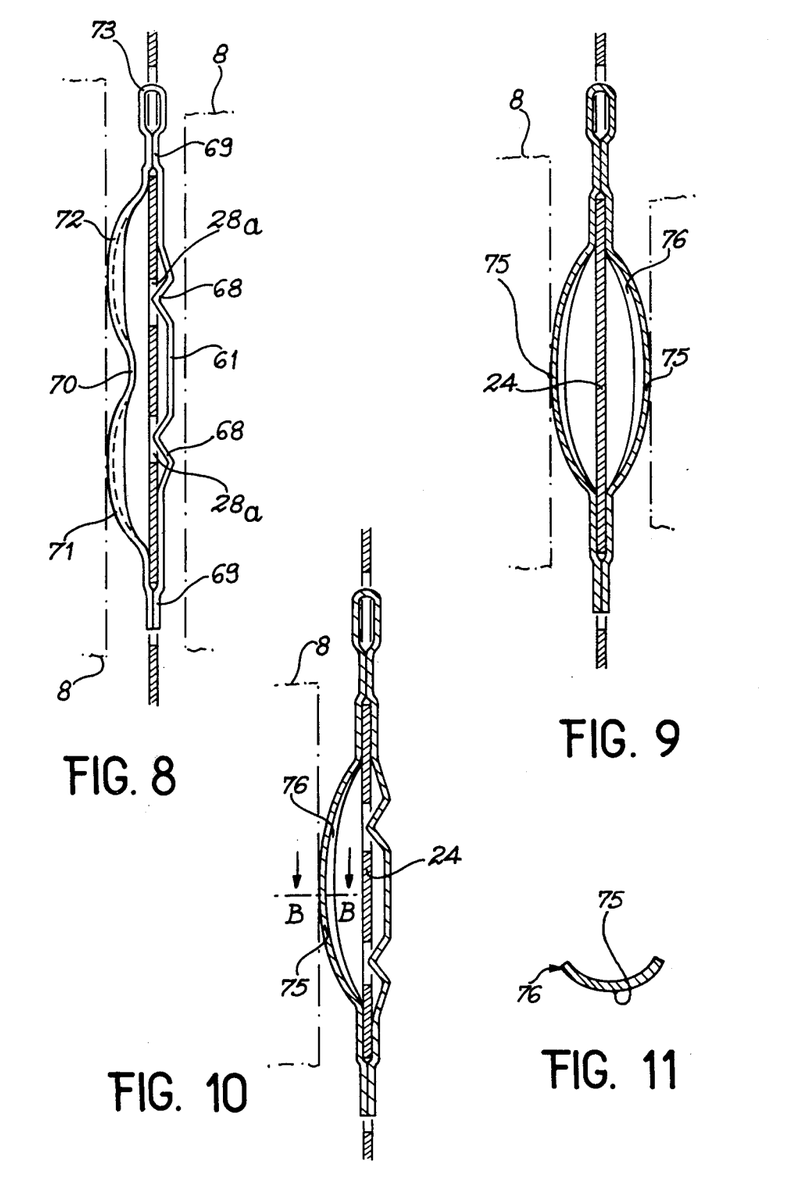
FIG. 9 shows a double spring in simplified form, in a view in section through a vertical plane.
FIG. 10 also shows, in a view in section through a vertical plane, a single spring of simplified form.
FIG. 11 is a section along B—B of FIG. 10.

FIGS. 7 and 8 show single springs comprising one active part 60 only, the pin closing on the other face of the plate 24 by a straight arm 61 which does not come into contact with the fuel pencil disposed in the corresponding cell of the grating.

The central zone 62 of the active arm of the pin is rigidified by forming the metal leaf and support surfaces 64 and 65 are disposed on either side of this rigidified part of the arm of the pin.

The spring shown in FIG. 8 comprises, on the contrary, a flexible central zone 70 and two upper and lower rounded zones 71 and 72 coming into contact with the pencil and rigidified by shaping the leaf into a C.

In the case of the springs shown in FIGS. 7 and 8, the deformation of the active arm is adapted by elongation of the opposite arm 61.

The elongation of the active part of the spring under the effect of the transverse forces and that of the opposite arm 61 are compensated in the case of the springs shown in FIGS. 7 and 8 by two deformation zones 68.

In the case of the springs shown in FIGS. 7 and 8, openings 28a made in the plate 24 enable the bent parts 68 of the arm 61 to be introduced into these openings.

As in the case of the double springs, the end zones 69 of the spring pins are connected by welding and the upper part of the pin is constituted by a loop 73.

In the case of the single springs and the double springs, the spring pin is mounted with clearance on the plate 24 at an opening 27 allowing the spring pin to be held in position on the plate after the ends have been welded, whilst providing a considerable initial axial clearance. This initial clearance makes it very simple to position the springs and allows a broad tolerance on the distance between the zones of weld of the spring at its end and the openings 27 of the plate. The arrangement of the openings in the plates and the shape of the pins allow easy assembly and possibly dismantling of these pins when the plates forming the grating are assembled. This constitutes an advantage for the possible pin replacing operations during manufacture.

The springs are designed to work elastically with elongation of the pin; the ends of the springs are therefore mounted to slide freely with respect to the plate which supports them.

However, in those cases where considerable transverse forces are exerted on the preceding springs, the transfer of these forces on the plates of the cell would be limited to the central zone only of these springs, due to the arrangements of the invention.

FIGS. 9 and 10 respectively show a double spring and a single spring which are mounted on a plate 24 in the same manner as the springs which have been described with reference to FIGS. 4 to 8, but which comprise only one support zone 75 for each of their active parts projecting in a cell containing a fuel pencil. The rigidity of this support zone is ensured by folding the arms 76 of the leaf to obtain a C-section, as may be seen in FIG. 11.

This amplified form of spring does not make it possible to obtain a semi-rigid fit which is as efficient as when two support zones of each active part of the springs are disposed at the level of two rigid stops borne by the faces of the cell opposite the faces bearing the springs. However, this type of spring may be sufficient if a very strong moment of semi-rigid fit is not sought for the fuel pencil in the cell of the grating.

In the case of a grating of a 17×17 assembly, i.e. an assembly disposed in a square lattice comprising 17 rows of 17 cells of which 24 are occupied by guide tubes, one by a tube comprising automatic control instruments, and the others by fuel pencils, 244 double springs and 40 single springs of the type shown in FIGS. 4 and 6 are used in association with rigid stops disposed in two's on the faces of the cells to effect transverse holding of the fuel pencils.

284 spring pins have therefore been used for a total of 528 springs, which clearly shows the simplified assembly with respect to a device preferably using single springs.

With reference to FIGS. 12 to 15, other possible embodiments of the supports made in walls of cells of gratings for fuel elements will now be described.

In all these embodiments, the essential and original feature lies in the fact that all the springs and rigid stops are added and made separately from one another of a nickel alloy before being assembled by welding on the walls of the cells which bear openings provided to this end. This system allows the limitation of the axial elongation of the springs when they slide along the plates of the cell, and the taking up of the forces on the parts forming spring whether the wall comprises a double spring or a single spring cooperating with a rigid stop on the other face.

In the embodiments which will now be described, the walls of cells comprise solely openings which are made by machine without stamping and consequently allow a more resistant and less ductile material to be used. The support pieces are added to the plate constituting the wall and, as they are generally made of material which considerably absorbs the neutrons, the quantity of material is strictly limited to that necessary for making the different springs and rigid stops, as will appear from the following description.

Figures 12A, 12B:
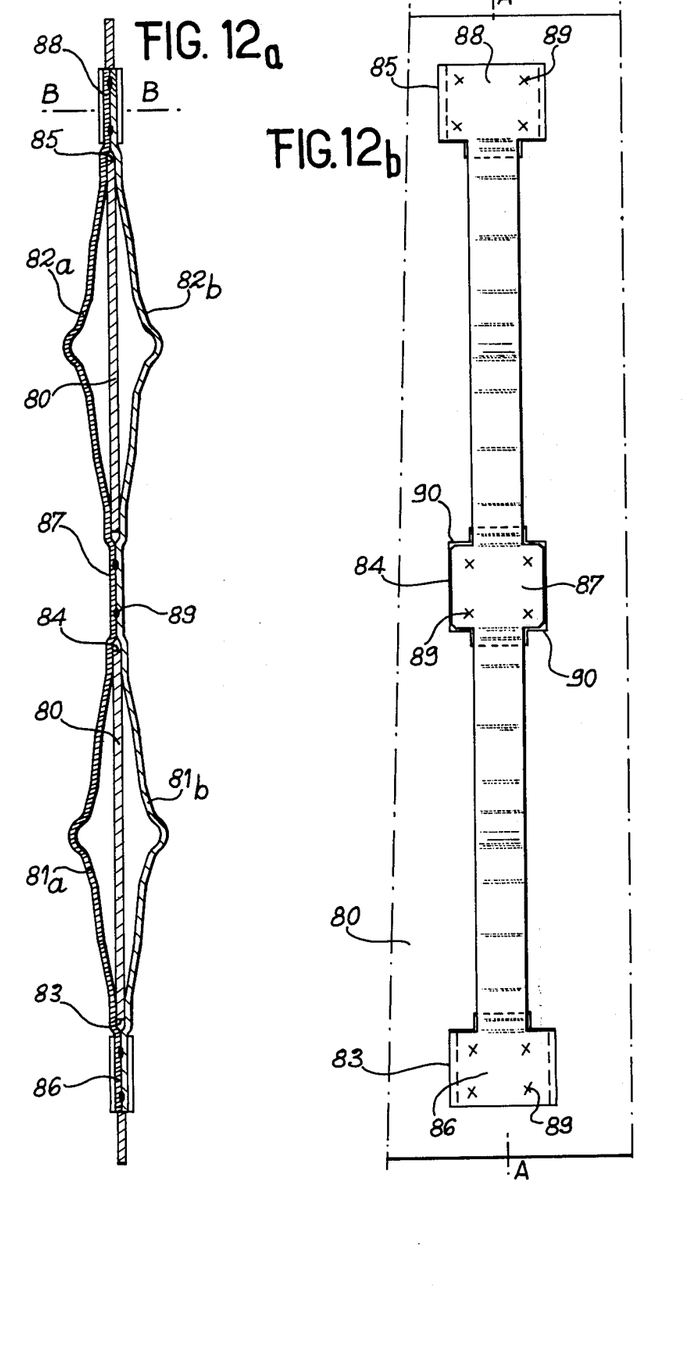
FIGS. 12a, 12b, 12c show an advantageous variant embodiment of cell walls of the spring-spring type.

FIG. 12 shows, at 80, the wall of a cell equipped on either side with two double springs 81a, 81b and 82a and 82b. FIG. 12a is a section along A—A of FIG. 12b, which is a plan view of FIG. 12a. The plate 80 comprises three rectangular openings 83, 84 and 85 located respectively near the upper and lower edges and at the centre of this plate. In each of these openings 83, 84 and 85 is located a contact shoulder, namely 86, 87 and 88 respectively, via which the two preceding springs are in contact, welded to one another, and tighten on the plate 80. To this end, a certain number of weld spots such as 89 are provided on each shoulder. The central sliding shoulder 87 comprises a longitudinal clearance 90 in its housing 84, which makes it possible thus to effect a sliding fix, without longitudinal contact for the central shoulder 87. This clearance is very important, as it allows the balancing of the reactions of the different springs on the fuel pencils (not shown) by longitudinal displacement of all the pieces 81 and 82 added to the plate 80. At the ends of the springs 81 and 82, the stop is established by compression in the plane of the plate 80 on the section of the housings of shoulder 86 and 88 in the plate itself.

Figure 12C:
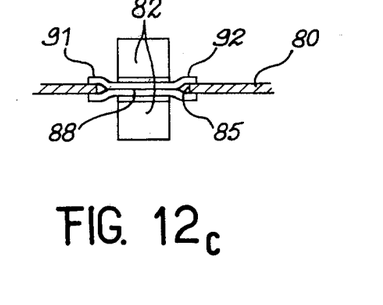

Finally, FIG. 12c which is a section through FIG. 12a along B—B at the top end shows how the edges 91 and 92 of the shoulder 88 make it possible, by tightening on the plate 80 in the edges 91 and 92, to avoid the shoulder 88 escaping through the cut-out orifice 85 in the plate 80. The same applies to the shoulder 86 located in the lower part.

As may be verified in the different FIGS. 12, the only forces which the plate 80 may undergo in operation are contained in its plane to the exclusion of any bending moment which might cause inadmissible deformation thereof. In fact, the forces exerted on either side on the springs 81 and 82 are balanced and are transferred to the shoulders 86, 87 and 88 where they are compensated two by two and face to face.

Figure 13A:
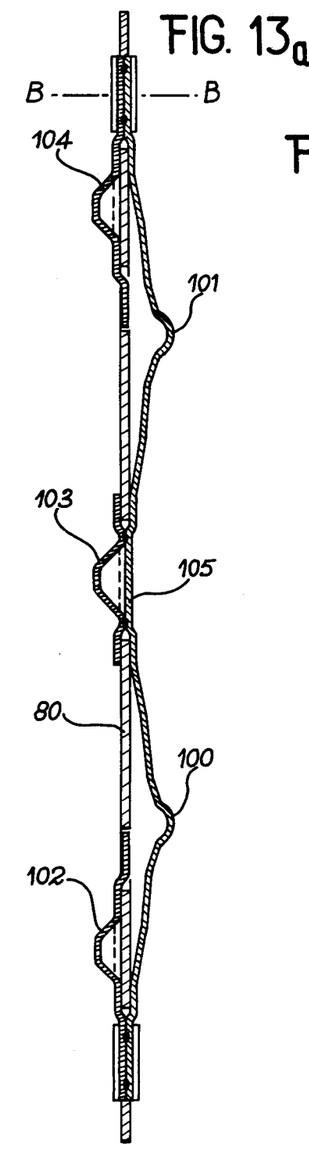
FIGS. 13a, 13b, 13c show an advantageous variant embodiment of cell walls of the spring-rigid stop type.
Figure 13B:
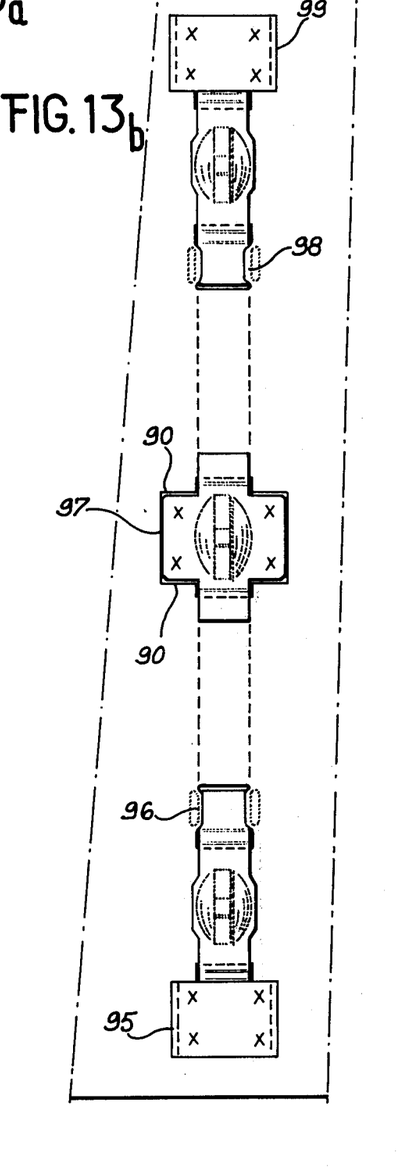
Figure 13C:
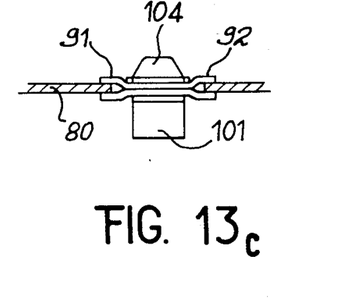

The different FIGS. 13 show in section, elevation and plan view, the embodiment of a wall comprising two springs on one face and three rigid stops on the opposite face. The plate 80 comprises in this example five openings referenced 95, 96, 97, 98 and 99 respectively. The added pieces comprise, on one side, the springs 100 and 101 and, on the other side, the rigid stops 102, 103 and 104. The mode of implanting the preceding added pieces on the plate 80 is of the same nature as that of the embodiment of FIG. 12 concerning the ends and the centre. The central join constituted by a rigid stop 103 and by the zone of connection 105 between the two springs 100 and 101 is mounted to slide with two longitudinal clearances 90 in the opening 97 of the plate 80 so as to form a central sliding shoulder. As in the preceding embodiment of FIG. 12, FIG. 13c which is a section of FIG. 13a along B—B, shows the edges 91 and 92 of the end shoulder making it possible to avoid the passage of said shoulder through the corresponding orifice 95 or 99.

In this embodiment, the end of the rigid end stops 102 and 104 opposite the orifices 95 and 99 is fitted in the orifices 96 and 98 by crimping in the edges of the plate 80. It is also very advantageous to make the three rigid stops 102, 103 and 104 by giving them an ovoid form, which largely facilitates the flow of the water and avoids the highly undesirable phenomena of cavitation during operation. Rigid stops formed in this way may easily be obtained by cold stamping.

As in the example of FIG. 12, it is readily seen that the balancing of the reactions occurring on either side of the wall 80 is effected face to face at the welds without introducing any bending torque on the plate 80, which is affected only at its ends by forces contained in its plane.

Figures 14A, 14B:
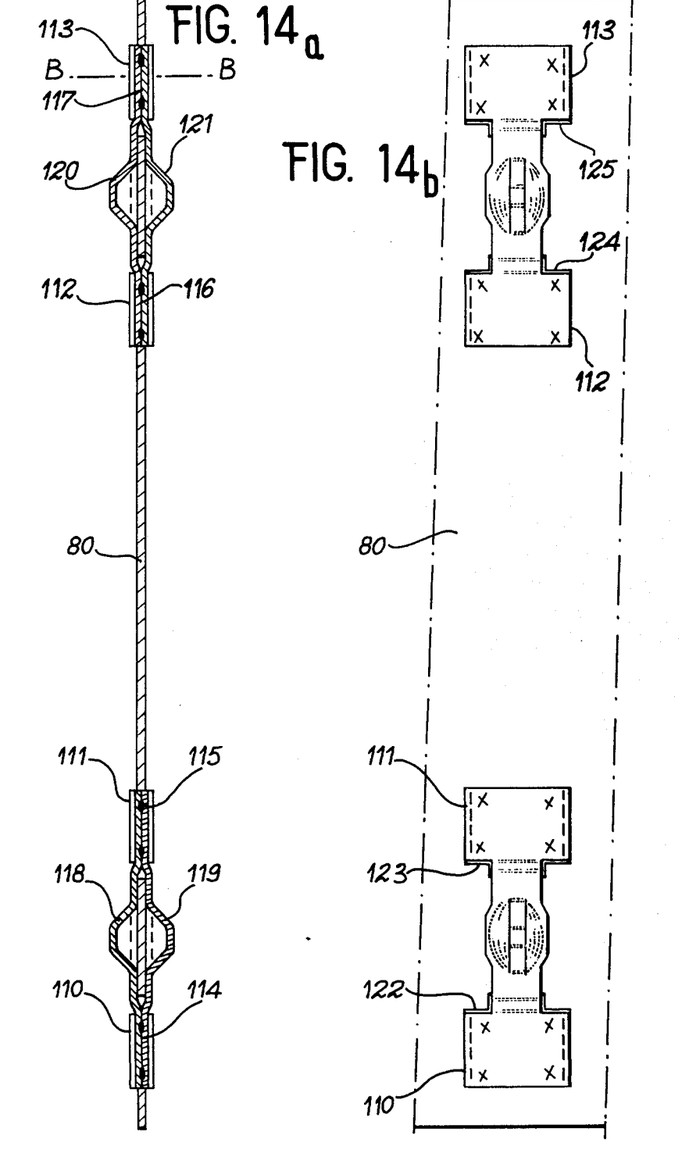
FIGS. 14a, 14b, 14c show an advantageous variant embodiment of cell walls of the rigid stop-rigid stop type.
Figure 14C:
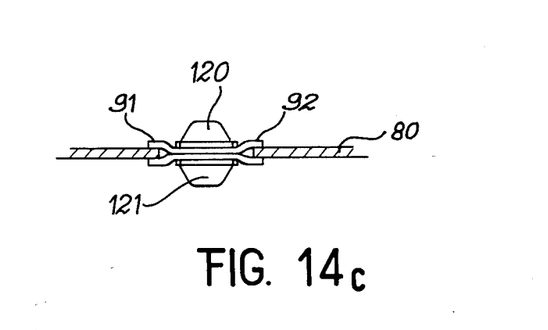

The embodiment of a plate of a cell 80 equipped on either side with two rigid stops of ovoid form, will now be described with reference to FIGS. 14a, 14b and 14c.

In this embodiment, the plate 80 comprises four rectangular openings 110, 111 at one of its ends and 112, 113 at the other end, in which are welded the shoulders 114, 115, 116 and 117 of the two plates in which the ovoid rigid stops 118, 119, 120 and 121 are formed on either side. The four shoulders 114, 115, 116 and 117 are held in position on the wall 80 by the edges 91 and 92 comparable with those of FIGS. 12c and 13c. This is shown very clearly in FIG. 14c which is a section along B—B of FIG. 14a at the level of one of the shoulders 114, 115, 116 or 117. Clearances 122 and 123 on the one hand and 124 and 125 on the other hand are provided in the longitudinal direction between the shoulders 114, 115 on the one hand and 116, 117 on the other hand and the corresponding openings 110, 111, 112 and 113, so as to allow the balancing of the forces exerted transversely on the corresponding rigid stops. In the embodiment of FIGS. 14, it is seen that the pieces constituting the different stops 118, 119, 120 and 121 and their weld shoulder at the ends are strictly limited and do not cover the plate 80 entirely, in order to limit as much as possible the introduction into the grating of a material which considerably absorbs the neutrons. Furthermore, the same applies to the balancing of the pressures on either side and the absence of any bending torque and any embossed portion in the plate as far as the advantages of this embodiment are concerned.

Figure 15:
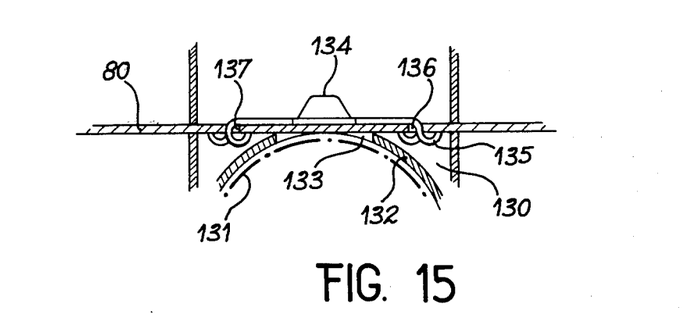
FIG. 15 shows an advantageous embodiment of cell walls of the guide tube-rigid stop type.

Referring now to FIG. 15, the manner will finally be described in which the plate 80 of a cell 130 is equipped, in which a guide tube 131 slides. Such guide tubes are inserted with easy fit in a sleeve 132 comprising a window 133 at the level of its contacts with each of the walls such as 80. A rigid stop 134 is fixed on the face of the wall 80 opposite the guide tube 131 with the aid of a double crimping 135 through slots 136 and 137 made in the wall 80.

In the case of this preferred application of the invention, each of the fuel pencils is therefore held inside each of the cells by two springs each comprising two support faces and by two sets of rigid stops disposed substantially opposite the support surfaces of the springs. The pencil is therefore in contact with the holding elements at at least eight different zones for each of the cells. This procures a semi-rigid fit avoiding considerable angular deviations of the pencils with respect to the vertical direction.

It is therefore seen that the main advantages of the invention are to allow an efficient semi-rigid fit of the fuel pencils inside the cells of the spacer grating without exerting on these pencils high pressures which might destroy the cladding of the pencil; to reduce the number of added elements made of material absorbing the neutrons, whilst enabling all the pencils to be held identically despite the presence of the guide tubes. In an assembly having an odd number of cells on each of the sides of the grating, the invention allows a simple assembly of the elements for transversely holding the fuel pencils on the grating, these holding elements not passing onto the plates of the grating all the transverse forces exerted by the fuel pencils.

However, the invention is not limited to the embodiments which have just been described, but covers all the variants thereof.

Plates may thus be made in different shapes from those which have been described.

Pieces made of material identical to the material of the plates may also be added, welded at the desired spots. Rivets may also be used, fixed on the plates and whose heads projecting inside the cells would constitute rigid stops.

Similarly, for the double springs or the single springs, shapes may be used which differ from those which have been described. These springs may in particular have any number of support points adapted to come into contact with the fuel pencils along a generatrix of these pencils which are in contact via the diametrically opposite generatrix with rigid stops in equal number or in different number.

In all the embodiments of the present invention, it is judicious to choose the materials constituting the grating so that the absorption of the neutrons is reduced to the strict minimum. To this end, for example, the plates are most often made of an alloy based on zirconium such as zircaloy which is transparent to neutrons, and the added holding elements are made of a nickel based alloy such as Inconel or nimonic with high mechanical strength.

Finally, the spacer grating according to the invention is applicable whatever the number of fuel pencils in the lattice and whatever the type of reactor for which the fuel assembly is intended.

What is claimed is:

1. Spacer grating for a fuel assembly used in a nuclear reactor constituted by intersecting plates in square-mesh lattice form, in the cells of which pass the fuel pencils for transverse holding thereof, these pencils constituting a bundle where certain pencils are replaced by guide tubes, the plates which constitute the walls of the cells bearing elements for holding the fuel pencils projecting inside the cells, of two types, namely, on the one hand, rigid stops and, on the other hand, springs adapted to exert transverse forces on the fuel pencils, added to the grating and disposed around the plates so that each of the faces of each cell containing a pencil bears an element of type different from that borne by the opposite face, wherein said grating comprises:

on the greater part of the walls equipped with springs, double springs comprising two active parts on either side of the wall on which the double spring is placed, allowing the symmetrical action of this spring on two different pencils inside two adjacent cells;

on the other walls equipped with springs, single springs comprising one active part only disposed in one of the two cells separated by the wall on which is placed the spring of which the other part is not capable of coming into contact with a fuel pencil;

rigid stops made on the plates of the grating independently of the springs.

2. The spacer grating of claim 1, wherein the springs comprise two arms disposed on either side of the wall and welded together at their two ends so that the moments and shearing strains are balanced to a great extent by those of the other arm and are virtually not transmitted to the plate constituting the wall of the grating on which the ends of the springs may slide freely.

3. The spacer grating of either one of claims 1 and 2, wherein the spring works essentially by axial deformation without transferring the axial forces on the plates constituting the walls of the cells of the grating.

4. The spacer grating of any one of claims 1 and 2, wherein part of the springs, at least, have on their active parts a sectioned form comprising two parts projecting inwardly of the cells of the grating coming into contact with one of the generatrices of the pencil at two points spaced apart at maximum along the length of this pencil.

5. The spacer grating of claim 4, wherein the springs have a C-section in their projecting part.

6. The spacer grating of claim 4, wherein the projecting parts of the springs coming into contact with the pencils are separated by a rigid part of C-section allowing the balancing of the forces between the two zones in contact.

7. The spacer grating of claim 4, wherein the projecting parts of the springs coming into contact with the pencil are separated by a zone of articulation of low rigidity for taking up at least part of the forces exerted on the active part of the spring.

8. The spacer grating of claim 4, wherein the faces of the cells opposite the springs having two projecting parts coming into contact with the pencil comprise two rigid stops disposed substantially at the level of the projections of the springs in the transverse direction perpendicular to the faces of the cells in question.

9. The spacer grating of any one of claims 1 and 2, wherein at least a part of the springs have on their active part a section comprising only one part projecting inwardly of the cells of the grating coming into contact with the pencil at one point only of said pencil.

10. The spacer grating of claim 9, wherein the projecting part of the springs has a C-section.

11. The spacer grating of claim 9, wherein the faces of the cells opposite the springs having only one projecting part coming into contact with the pencil comprise two rigid stops disposed substantially symmetrically with respect to the projecting part of the spring.

12. Spacer grating for a fuel assembly used in a nuclear reactor constituted by intersecting plates in square-mesh lattice form, in the cells of which pass the fuel pencils for transverse holding thereof, these pencils constituting a bundle where certain pencils are replaced by guide tubes, the plates which constitute the walls of the cells bearing elements for holding the fuel pencils projecting inwardly of the cells and of two types, namely, on the one hand, rigid stops and, on the other hand, springs adapted to exert transverse forces on the fuel pencils, added on the grating and disposed around the plates, so that each of the faces of each cell containing a pencil bears an element of type different from that borne by the opposite face, wherein said grating comprises:

on the greater part of the walls equipped with springs, double springs comprising two active parts on either side of the wall on which is placed the double spring, allowing the symmetrical action of this spring on two different pencils inside two adjacent cells, on the other walls equipped with springs and/or rigid stops, single springs comprising one active part only, disposed in one of the two cells separated by the wall on which is placed the spring which is connected to rigid stops coming into contact with the fuel pencil passing through the cell located on the other side of said wall, rigid stops located on one side of a wall of the cell and constituted by added pieces made fast with the single springs or the rigid stops placed on the other side of the wall.

13. The spacer grating of claim 12, wherein the walls of cells equipped on one side with springs and on the other side with rigid stops comprise a spring with two projections and three rigid stops added and fixed to the wall due to two welded end shoulders and to a likewise welded median sliding plate, each housed in one of the three rectangular openings made in alignment on the wall, and to two semi-rigid fit orifices disposed in the vicinity of the shoulders, so that the balancing of the transverse thrust forces exerted on each side of the wall takes place directly via the end and median shoulders, without straining the wall in flexion, the balancing of the longitudinal thrusts on the two projections being effected by sliding of the median sliding shoulder mounted to this end with a longitudinal clearance in its opening, and the fixing of the end shoulders in their respective opening being obtained with the aid of bent edges of the shoulders tightening on the wall.

14. The spacer grating of claim 12, wherein the walls of cells equipped with rigid stops on their two faces comprise a pair of rigid stops back to back at each end, each rigid stop being of ovoid form, obtained by cold-forming, each pair of rigid stops being added and fixed to the wall via a welded shoulder, each mounted with a longitudinal clearance in a rectangular opening in the wall to which they are fixed by bent edges tightening on the plate.

15. The spacer grating of claim 12, wherein the walls of cells equipped on both sides with springs, have two pairs of springs on each side of the wall, constituted by two continuous strips welded to one another at three zones through three aligned rectangular openings in the wall, namely two end zones or shoulders fixed by bent edges to the wall and a central zone or median sliding shoulder mounted with a longitudinal clearance in its corresponding opening.

16. The spacer grating of claim 12, wherein the outer wall of a cell containing a guide tube is equipped with an added rigid stop, formed in a strip crimped at its two ends in a slot made to this end in said wall.

17. The spacer grating of any one of claims 1 to 16, wherein the cell wall being made of zircaloy, the added springs and rigid stops are made of a material chosen from the group consisting of Inconel and nimonic.

18. The spacer grating of either one of claims 1 and 12, wherein, to promote the guiding of the plates forming the walls of the cells during assembly, said plates are provided with embossed portions having a bevelled section in the direction of introduction of said plates.

* * * * *

UNITED STATES PATENT AND TRADEMARK OFFICE
CERTIFICATE OF CORRECTION

PATENT NO. : 4,411,862
DATED : October 25, 1983
INVENTOR(S) : Leclercq et al

It is certified that error appears in the above-identified patent and that said Letters Patent are hereby corrected as shown below:

On the cover page, the Assignment data should read as follows:

--[73] Assignee: Commissariat a l'Energie Atomique, Paris, France and

Framatome, Courbevoie, France --

Signed and Sealed this

Nineteenth Day of February 1985

[SEAL]

Attest:

DONALD J. QUIGG

Attesting Officer     Acting Commissioner of Patents and Trademarks